UNITED STATES PATENT OFFICE.

JOHN A. FREEZE, OF MASON, TEXAS, ASSIGNOR OF ONE-FOURTH TO ROBERT H. BAIRD, OF SAME PLACE.

COMPOSITION OF MATTER.

SPECIFICATION forming part of Letters Patent No. 536,987, dated April 2, 1895.

Application filed June 13, 1894. Serial No. 514,365. (No specimens.)

*To all whom it may concern:*

Be it known that I, JOHN A. FREEZE, a citizen of the United States, residing at Mason, in the county of Mason and State of Texas, have invented a new and useful Composition of Matter, of which the following is a specification.

My improved compound consists of the following ingredients combined in the proportions stated, to wit:—coal tar, fifty gallons; pitch, twenty pounds; alum, five pounds; rock salt, six pounds; oxide of iron, ten pounds; sal soda, five pounds; bi-carbonate of soda, five pounds; chloride of lime, five pounds; asphaltum varnish, three gallons.

To prepare the mixture, I take five gallons of the coal tar, mingle with it the other ingredients specified, with the exception of the asphaltum varnish, and cook the mass for two and a half hours, when it is added to the remaining forty-five gallons of coal tar, the whole boiled and well stirred and, finally, the asphaltum varnish is added and well stirred in.

The compound is used as a roofing paint and forms a cement which is well adapted for application to wood, paper or metal roofs and to other structures to protect them from the weather.

The mixture is applied hot and may be applied by means of a brush. It renders the material to which it is applied waterproof and almost fireproof.

What I claim, and desire to secure by Letters Patent of the United States, is—

1. The herein-described composition of matter for a cement, consisting of coal tar, pitch, alum, rock salt, oxide of iron, soda, and chloride of lime, combined in substantially the proportions stated.

2. The herein-described composition of matter for a paint, consisting of coal tar, pitch, alum, rock salt, oxide of iron, sal soda, bi-carbonate of soda, chloride of lime and asphaltum varnish, combined in substantially the proportions stated.

JOHN A. FREEZE.

Witnesses:
CHAS. SCHEUSSLER,
I. A. GERDE.